UNITED STATES PATENT OFFICE.

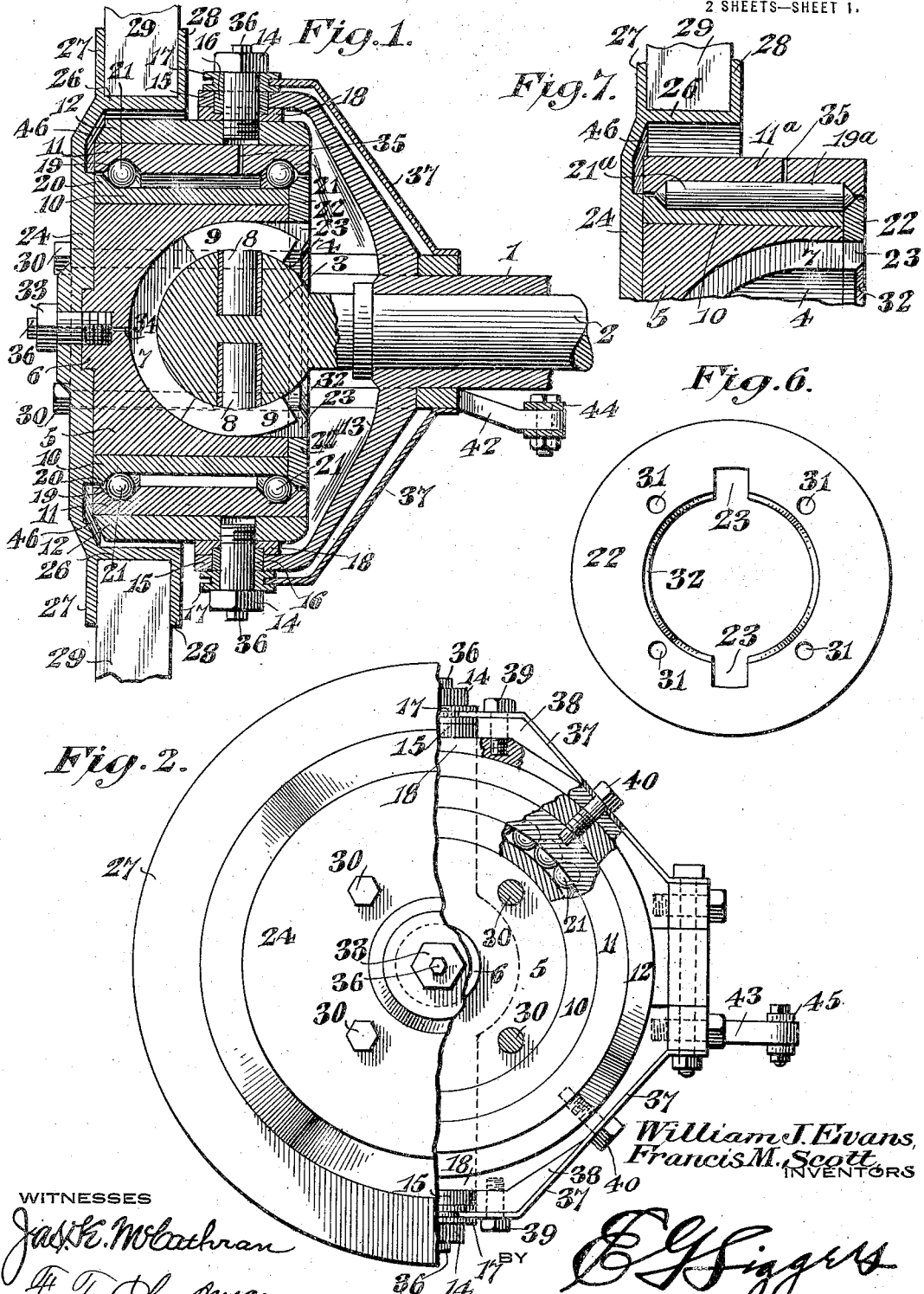

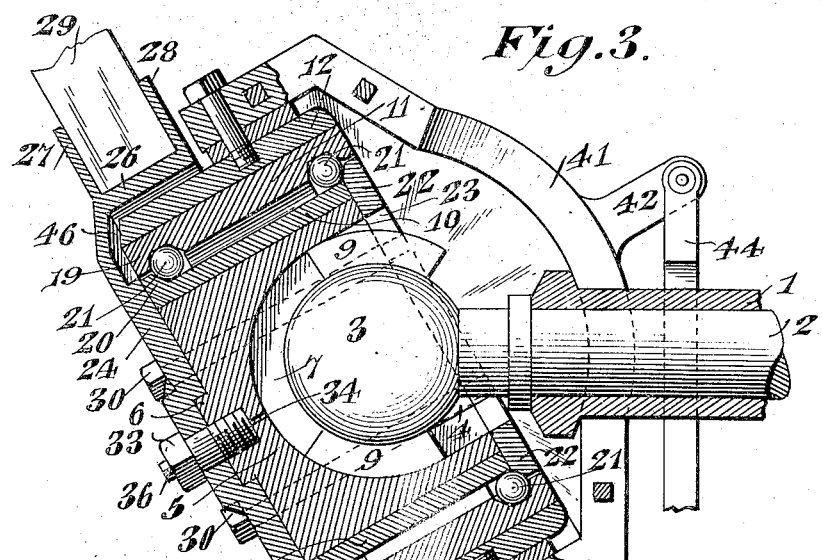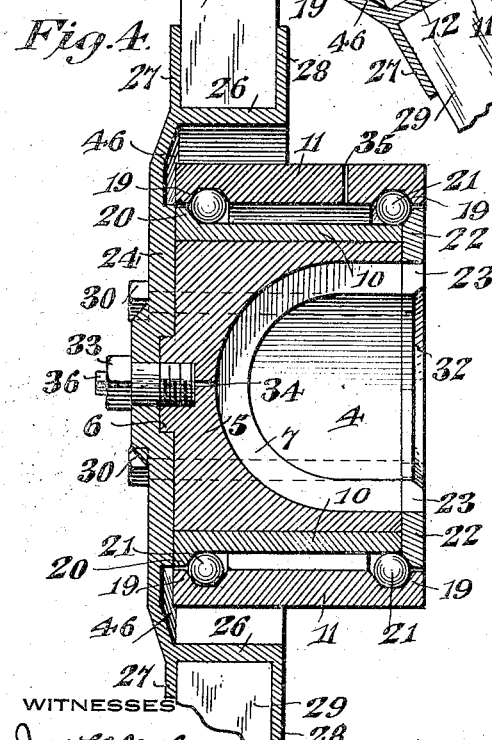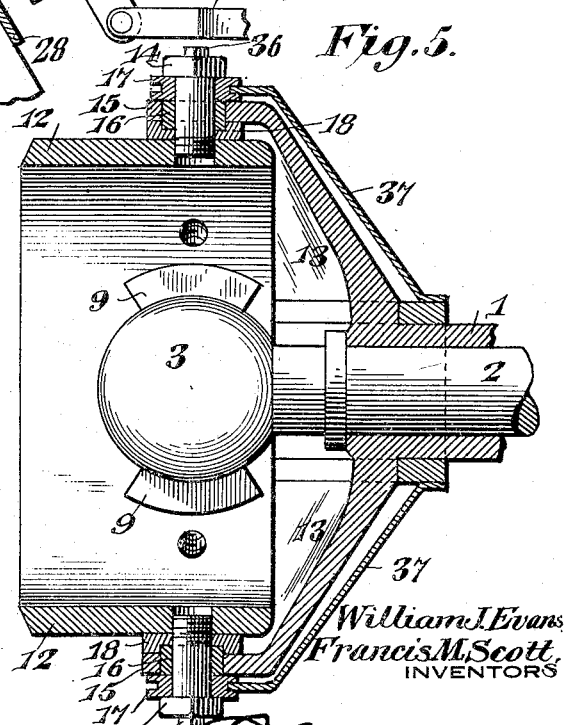

WILLIAM J. EVANS AND FRANCIS M. SCOTT, OF DAYTON, IOWA; SAID SCOTT ASSIGNOR TO SAID EVANS.

DRIVING AND STEERING WHEEL.

1,330,690.  Specification of Letters Patent.  Patented Feb. 10, 1920.

Application filed February 13, 1918, Serial No. 216,935. Renewed July 11, 1919. Serial No. 310,208.

*To all whom it may concern:*

Be it known that we, WILLIAM J. EVANS and FRANCIS M. SCOTT, citizens of the United States, residing at Dayton, in the county of Webster and State of Iowa, have invented a new and useful Driving and Steering Wheel, of which the following is a specification.

This invention has reference to driving and steering wheels for automobiles, and is an improvement upon the wheel shown and described in the application of William J. Evans, No. 115,709, filed August 18, 1916, for combined driving and steering wheel.

The object of the invention is to improve the construction of the wheel described in said application in various particulars, such as facilitating the assemblage and taking down of the wheel, and lessening the cost of manufacture.

The invention has to do with that type of wheel in which the rotatable part of the wheel is mounted upon an axle having a fixed relation to the vehicle body with which the wheel is associated, and the wheel is connected to a shaft having its axis of rotation coinciding with the longitudinal axis of the axle, by a ball and socket joint so constructed as to impart rotative movements to the wheel. Steering movements are imparted to the wheel in the customary manner employed upon automobiles, while the ball and socket joint permits driving motion to be imparted to the wheel irrespective of the angular relation of the wheel to the axis of rotation of the shaft.

Within the wheel between the drive shaft and the rotatable part of the wheel are devices, some of which are connected to the rotatable member of the wheel, and others of which are fixed against rotation by connection with the axle, while still other parts serve as bearings, particularly of the anti-friction type, permitting easy running of the wheel. The invention has particularly to do with certain devices for connecting the rotatable part of the wheel with the drive shaft, and for holding the parts in the assembled position, being so disposed that the wheel may be readily taken down by the removal of parts accessible from the outside of the wheel.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:—

Figure 1 is a diametric section of the wheel showing some parts in elevation;

Fig. 2 is a face view of the wheel, omitting the spokes and showing some parts broken away and in section;

Fig. 3 is a section at substantially right angles to that of Fig. 1, with certain of the parts in 90° relation to the showing of Fig. 1, and the wheel at an angle to a straight ahead course;

Fig. 4 is a sectional view similar to Fig. 1, but showing parts of the wheel removed from the parts directly carried by the axle;

Fig. 5 is a sectional view similar to that of Fig. 4, but showing the parts omitted in the showing of Fig. 4;

Fig. 6 is a detailed view of a holding ring forming part of the wheel;

Fig. 7 is a detailed section showing a different form of anti-friction bearing from the showing of the preceding figures.

Referring to the drawings, there is shown an axle 1 of the non-rotatable type, and this axle is longitudinally traversed by a driving shaft 2, which shaft may be assumed to be suitably connected to the power unit of the automobile to be driven thereby, so that such shaft may be termed a power shaft.

Only one wheel is shown in the drawings, but it may be assumed that two corresponding wheels are used as drive wheels, or all four wheels of the automobile may be power driven, the power driven wheels, in the case of two wheels, being either the front or the rear wheels of the vehicle. As the wheel structures are all alike, the description will be limited to one wheel only. The shaft 2 projects beyond the outer end of the axle 1, and at such outer end is formed into a ball 3 seated in a socket 4 formed in a block 5 of cylindrical shape, with an axial boss 6 at its outer end. The block 5 has a curved groove 7 communicating with the socket 4 and described about the center of curvature of said socket. The ball carries diametrically opposite pins 8 each provided with a head 9 seated in the groove 7, so that the block 5 is constrained to rotate with the shaft, but the block 5 and ball 3 may assume different relative positions. The parts so far described may correspond in the main to similar parts shown and described in the aforesaid application.

Surrounding the block 5 is a sleeve 10 which may be assumed to be fast to the block, and surrounding the sleeve 10 is another sleeve 11 which may be assumed to be fast to still another sleeve 12 carried by a yoke 13 made fast to the sleeve 12 by diametrically opposite pins or screws 14 in such a manner that the relative positions of the yoke 13 and sleeve 12 with respect to their longitudinal axes may be varied. The yoke 13 terminates in eyes 15 through which the screws 14 extend, these eyes being of sufficiently large diameter to each receive a ring 16 immediately embracing the shank of the screw 14, while a washer 17 and reinforcement 18 surround each screw 14 on opposite sides of the ring 16, the parts being so proportionate that the screw 14 clamps the ring 16 between the washer 17 and reinforcement 18 without binding the eyes 15. The result is that the yoke 13 may remain fixed to the axle, while the parts pivoted thereto by the screws 14 may move freely yet snugly about the axis defined by the screws 14. The sleeve 11 is formed with circumferential ball races 19, while the sleeve 10 is provided at what constitutes its outer edge with a circumferential flange 20, the other or inner edge having no flange. This provides for retaining inner and outer series of anti-friction balls 21, whereby the sleeve 10 and block 5 may rotate within the sleeve 11. There is also provided a retaining ring 22 acting as a retaining ring for the sleeve 10, and provided with diametrically opposite recesses 23 entering the ring from its inner edge and coinciding with the groove 7, so that the ring does not interfere with rocking movements of the block 5 with respect to the shaft 2.

Covering the outer faces of the block 5 and sleeves 10, 11 and 12 is a plate 24 having a recess 25 on its inner face to receive the boss 6. The plate 24 terminates in a circumferential flange 26 overriding a portion of the sleeve 12, the overriding flange 26 being provided with other flanges 27 and 28 spaced apart axially of the wheel, and projecting in a direction at right angles to the axis of the wheel to receive and hold spokes 29, but as the invention does not contemplate any particular mode of holding the spokes in place, the structure for such purpose is not shown, and any known arrangement may be employed.

The plate 24 is traversed by screws 30 in surrounding relation to the axis of the wheel and located to avoid the ball 3, the screws 30 extending through the block 5 and entering the ring 22 where threaded holes 31 are provided to receive such screws, the heads of the screws being located outside of the plate 24. In this way, the parts of the wheel are firmly held together by the screws 30 passing through the plate 24 and block 5, and entering the ring 22 which in turn serves as a part of one of the ball races, the inner portion of the ring being beveled as shown at 32 for the purpose. The balls 21 bind the sleeve 10 to the sleeve 11, and the latter is made fast to the yoke 13 which in turn is fast to the axle 1. In this way, the parts of the wheel are held together against accidental displacement without obtrusive friction, since the only connections are through the ball bearings, but on the removal of certain screws readily accessible from the outside of the wheel, the wheel may be removed from the axle and certain parts carried by the latter.

The plate 24 is traversed by a centrally located screw 33 extending through the plate 24 and tapped into the block 5. To facilitate lubrication, the screw 33 and also the screws 14 have oiling passages therethrough communicating with other passages 34 and 35 through the block 5 and sleeve 11 respectively. Oil cups or plugs 36 may be employed to close the passages through the screws to prevent the entrance of dust or dirt.

The axle 1 has shields 37 fast thereto, closing parts about the yoke 13 which would otherwise be exposed, these shields being usually of sheet metal and seated in the washers 17 which are suitably grooved for the purpose. At certain points, it is found advisable to locate blocks 38 held by screws 39 fastening the shields 37 in place, but these parts may be similar to like parts found in the aforesaid application. The sleeve 12 is conveniently made fast to the sleeve 11 by screws 40 also serving the purpose of holding the shields 37 in place.

To permit the turning of the wheel structure with respect to the longitudinal axis of the driving shaft, the yoke 13 has a slot or opening 41, and the yoke has lugs 42 and 43 respectively for reach rods 44 and 45. The reach rod 44 may be assumed as extending to the steering mechanism of the vehicle, while the reach rod 45 is provided to connect two wheels together for simultaneous movement under the action of a single rod 44. No particular description is needed for the yoke 13, shields 37 and other parts associated therewith, since these parts are disclosed in the aforesaid application, and in themselves form no part of the present invention.

The reinforcing member 18 may be shrunken, welded or otherwise secured to the sleeve 12, and serves as a strengthening member therefor. When the screws 40 are removed sufficiently to clear the sleeve 12, then the wheel with the sleeves 10 and 11 having the ball races is removable from the sleeve 12 with the wheel, the sleeve 12 remaining fixed to the axle. If it is desirable to remove the sleeve 11 from the sleeve 10 for inspection or repair of the ball bearings, this is readily accomplished by loosening or removing the screws 30. In order to further dismantle the structure, the screw 33 may be removed, thus permitting the plate or hub 24 to be separated from the block 5.

The hub or plate 24 has a recessed or dished marginal portion 46 so as to clear the sleeves 11 and 12 when the parts are properly assembled. The ball bearings are spaced apart axially of the wheel and the same distance from the wheel axis, with the bearings housed in the overhanging portion of the wheel hub to receive the strains well toward the outer end of the wheel, thereby effectively sustaining the wheel against distortion.

In Fig. 7, the anti-friction bearings are shown as roller bearings instead of ball bearings. Such roller bearings are readily substituted for ball bearings by providing a sleeve 11ª in place of the sleeve 11, and provided with a groove 19ª replacing the ball races 19 of the sleeve 11. The other parts are the same as shown in the other figures of the drawings. This permits the use of a series of anti-friction rollers 21ª replacing the two series of balls 21, the change requiring nothing more than the substitution of the sleeve 11ª for the sleeve 11.

What is claimed is:—

1. A combined driving and steering wheel having driving means and driven means with ball and socket connections therebetween, the driven means comprising a socket block receiving the ball member of the connections, anti-friction bearings surrounding the block, an axle, connections from the axle to the anti-friction bearings including fastening means between said connections and the anti-friction bearings accessible from the exterior of said connections, and a wheel hub secured to the block at the end of the latter remote from the ball and socket connections and having fastening means for securing it to the block also accessible from the exterior of the wheel.

2. A combined driving and steering wheel structure comprising an axle, a drive shaft extending therethrough, said drive shaft having a ball on its outer end, a socket block for receiving the ball, anti-friction bearings carried by the socket block in surrounding relation thereto, a sleeve surrounding the anti-friction bearings and fast to the axle and the outer member of said anti-friction bearings, and a spoke-carrying hub in partial overhanging relation to the sleeve and fast to the socket block, the fastening means between the hub and socket block and the fastening means between the sleeve and the outer member of the anti-friction bearings being readily accessible from the exterior of the hub and sleeve.

3. A combined driving and steering wheel comprising a socket block, a driving member having a ball connection with the socket block for rotating the latter, a plate-like hub carried by the socket block and in partial housing relation thereto, anti-friction bearings surrounding the socket block, with said bearings having an axial length corresponding to that of the socket block, a sleeve surrounding the anti-friction bearings and of corresponding length, an axle carrying the shaft, sustaining connections between the axle and shaft, and fastening means between the sleeve and anti-friction bearings and between the hub and socket block, whereby the connections are accessible from the outside of the wheel for the dismantling of the latter.

4. A combined driving and steering wheel comprising an axle, a driving shaft within the axle and extending therefrom and terminating in a ball member of a ball and socket joint, a socket block housing the ball member, concentric sleeves surrounding the socket block, with the inner sleeve fast to the socket block and the outer sleeve loose thereon, anti-friction bearings between the sleeves, another sleeve concentric with and outside of the first-named sleeves, with the third sleeve having fastening means for securing it to the neighboring sleeve, pivot connections between the axle and the outer sleeve for turning the latter on an upright axis, a plate-like hub partially housing the socket block and sleeves, a ring applied to the socket block and innermost one of the rings, and constituting an abutment for the anti-friction bearings, and fastening devices extending through the hub and ring and accessible from the exterior of the hub.

5. A combined driving and steering wheel provided with an axle and a drive shaft extending therethrough, driven parts connected to the shaft, a sleeve carried by the axle, anti-friction bearings between the sleeve and the driven parts, and readily removable connecting devices for securing the sleeve to the anti-friction bearings, with said devices accessible from the exterior of the wheel, whereby on removing the fastening devices the rotatable parts of the wheel, together with the anti-friction bearings, may be removed as a whole from the other parts of the wheel.

6. A combined driving and steering wheel comprising two separable structures, one including an axle with oppositely directed yokes or arms, a sleeve carried by the arms, and a drive shaft with a ball termination and carried by and extending beyond the axle, and the other structure including a driven member with a socket for receiving the ball of the drive shaft, a hub, and anti-friction bearings in surrounding relation to the ball-receiving part, and fastening means for securing the sleeve to the anti-friction bearings with the sleeve embracing the latter, whereby on the removal of the fastening means the second-named structure may be removed bodily from the sleeve.

7. A combined driving and steering wheel comprising an axle member, a drive shaft carried by the axle member and extending beyond the latter, a block constituting part of the driven structure of the wheel, ball and socket connections between the drive shaft and block, a plate-like hub carried by the block, a screw connecting the hub to the block, a ring on the face of the block remote from the hub, other screws traversing the plate and block and engaging the ring, and anti-friction bearings between the block and axle, with said anti-friction bearings in part formed by the ring.

8. In a combined driving and steering wheel, driving and driven members, an axle carrying the driving member, pivotal connections between the axle and driven member, and anti-friction bearings between the axle and the driven member and including a ring forming part of the anti-friction bearings, said driven member having fastening devices for the ring extending through a part of the driven member to the exterior thereof and there accessible.

In testimony that we claim the foregoing as our own we have hereto affixed our signatures in the presence of two witnesses.

WILLIAM J. EVANS.
FRANCIS M. SCOTT.

Witnesses:
C. L. RODINE,
HANNAH NELSON.